Dec. 23, 1924.

J. PATTEN 1,520,078

VOTING MACHINE

Filed May 2, 1921        12 Sheets-Sheet 1

Inventor
John Patten,
By Watson, Coit, Morse & Grindle,
Att'ys

Dec. 23, 1924.　　　　　　　　　　　　　　　　　　1,520,078
J. PATTEN
VOTING MACHINE
Filed May 2, 1921　　　12 Sheets-Sheet 3

Inventor
John Patten
By Watson, Coit, Morse & Grindle,
Attys

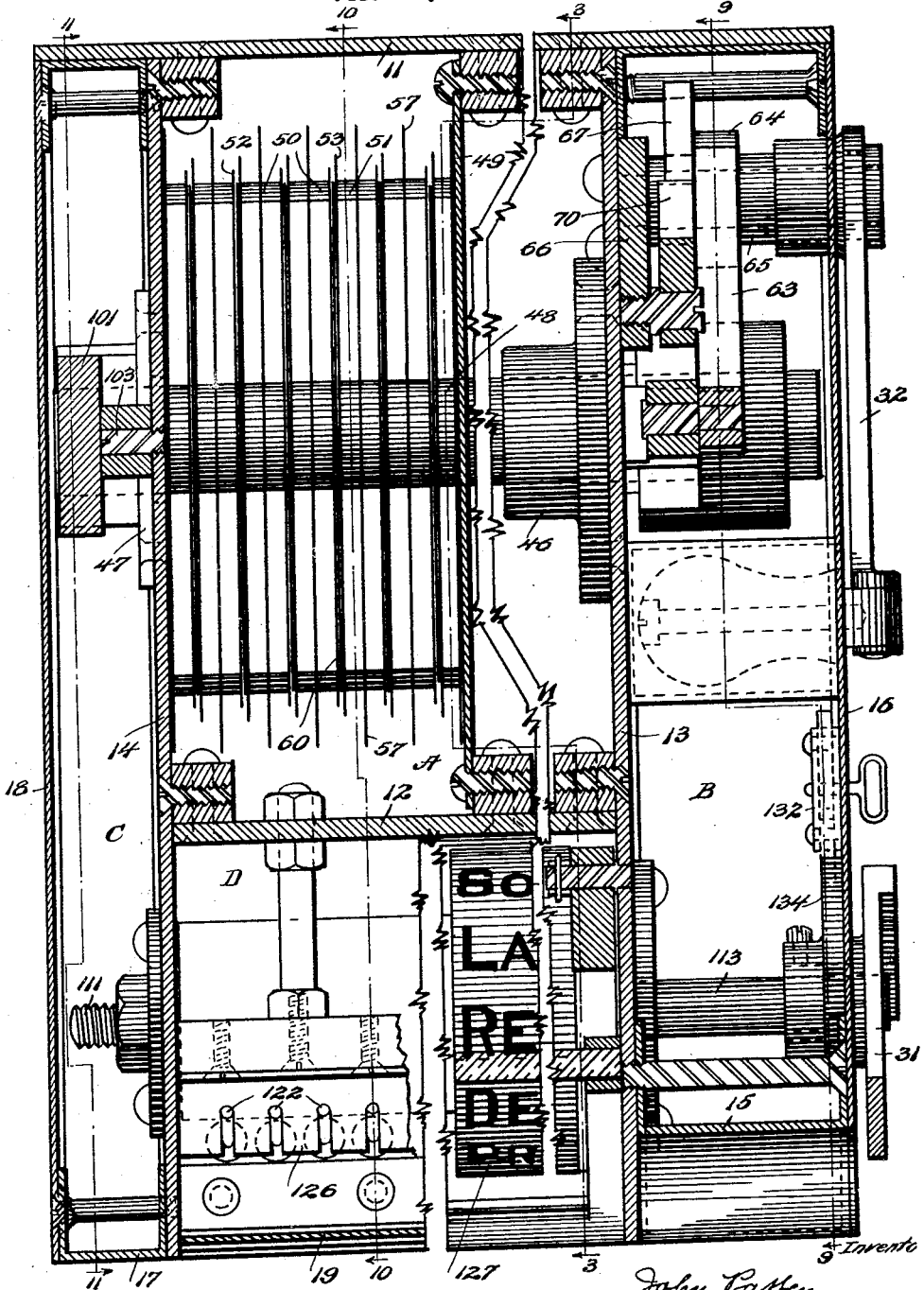

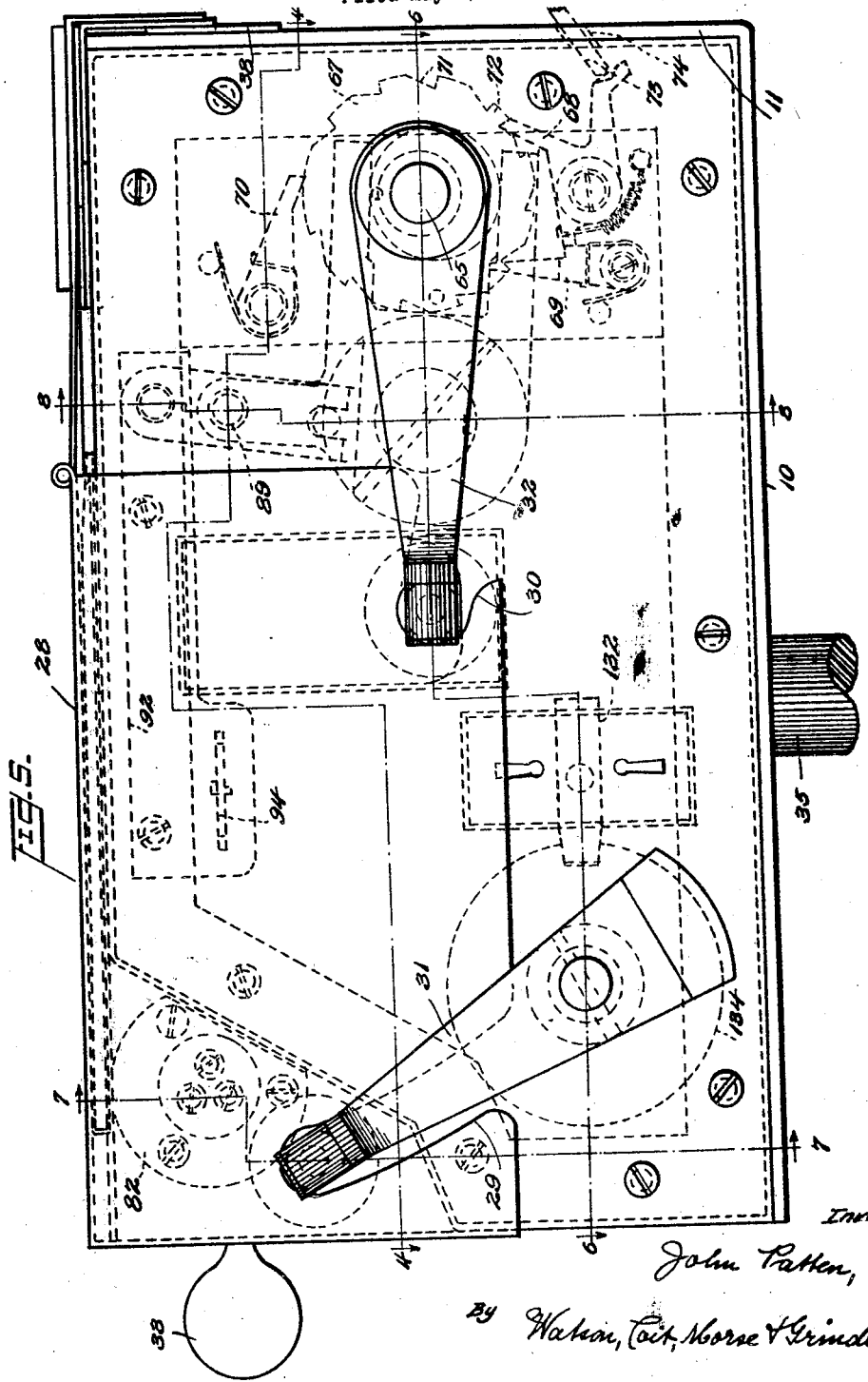

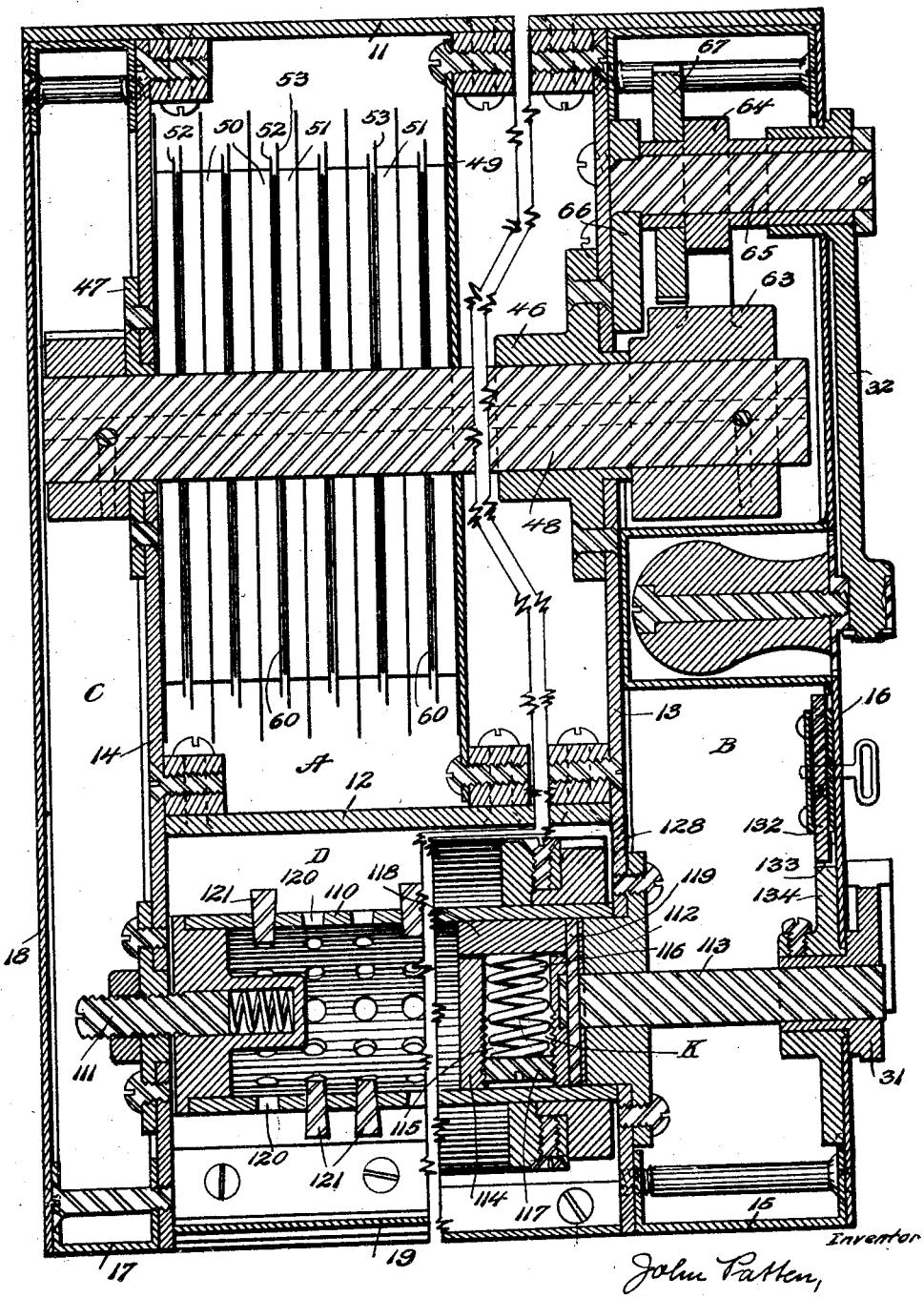

Dec. 23, 1924.
J. PATTEN
1,520,078
VOTING MACHINE
Filed May 2, 1921
12 Sheets-Sheet 7
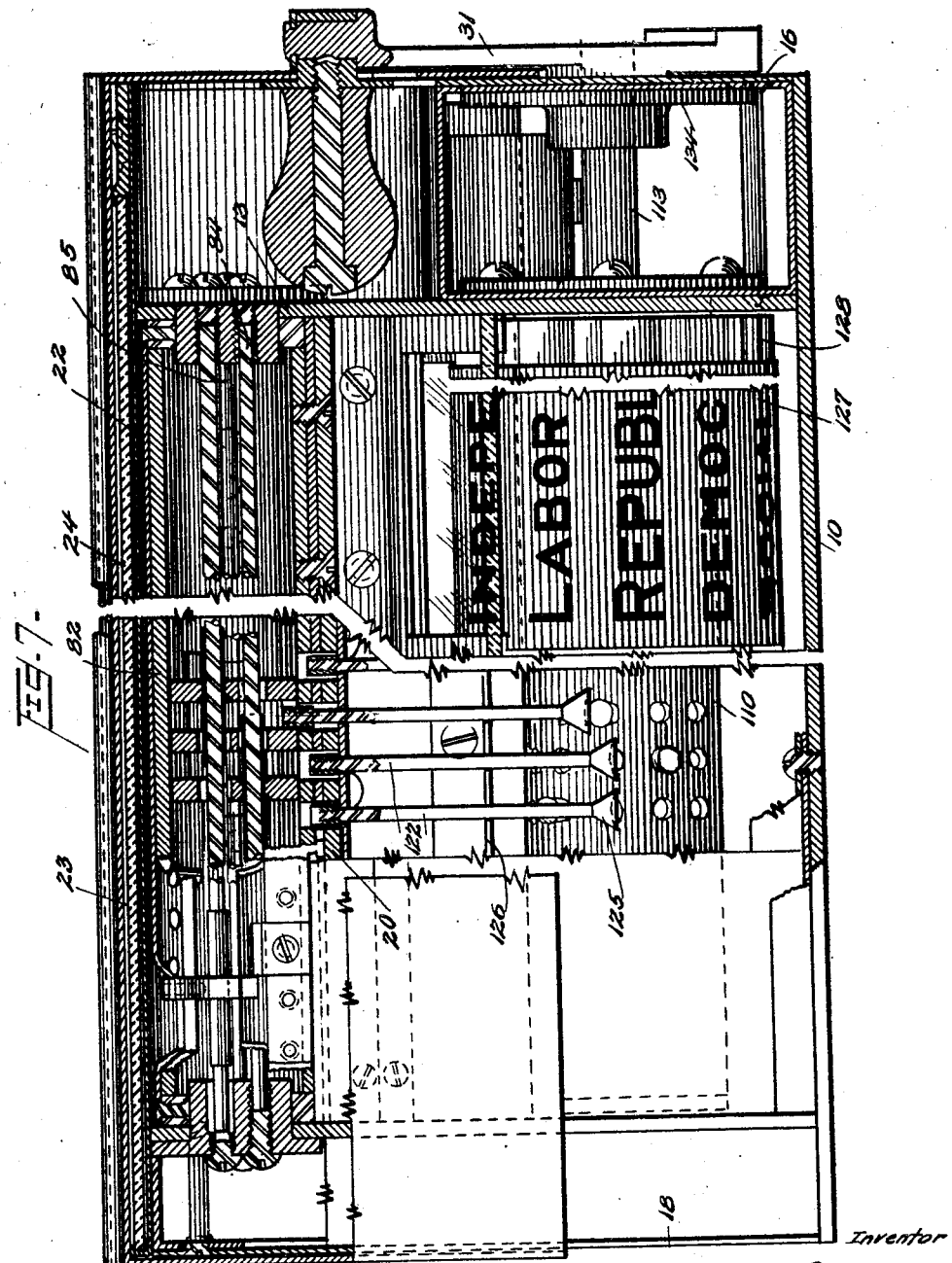
Inventor
John Patten,
By Watson, Coit, Morse & Grindle,
Attys

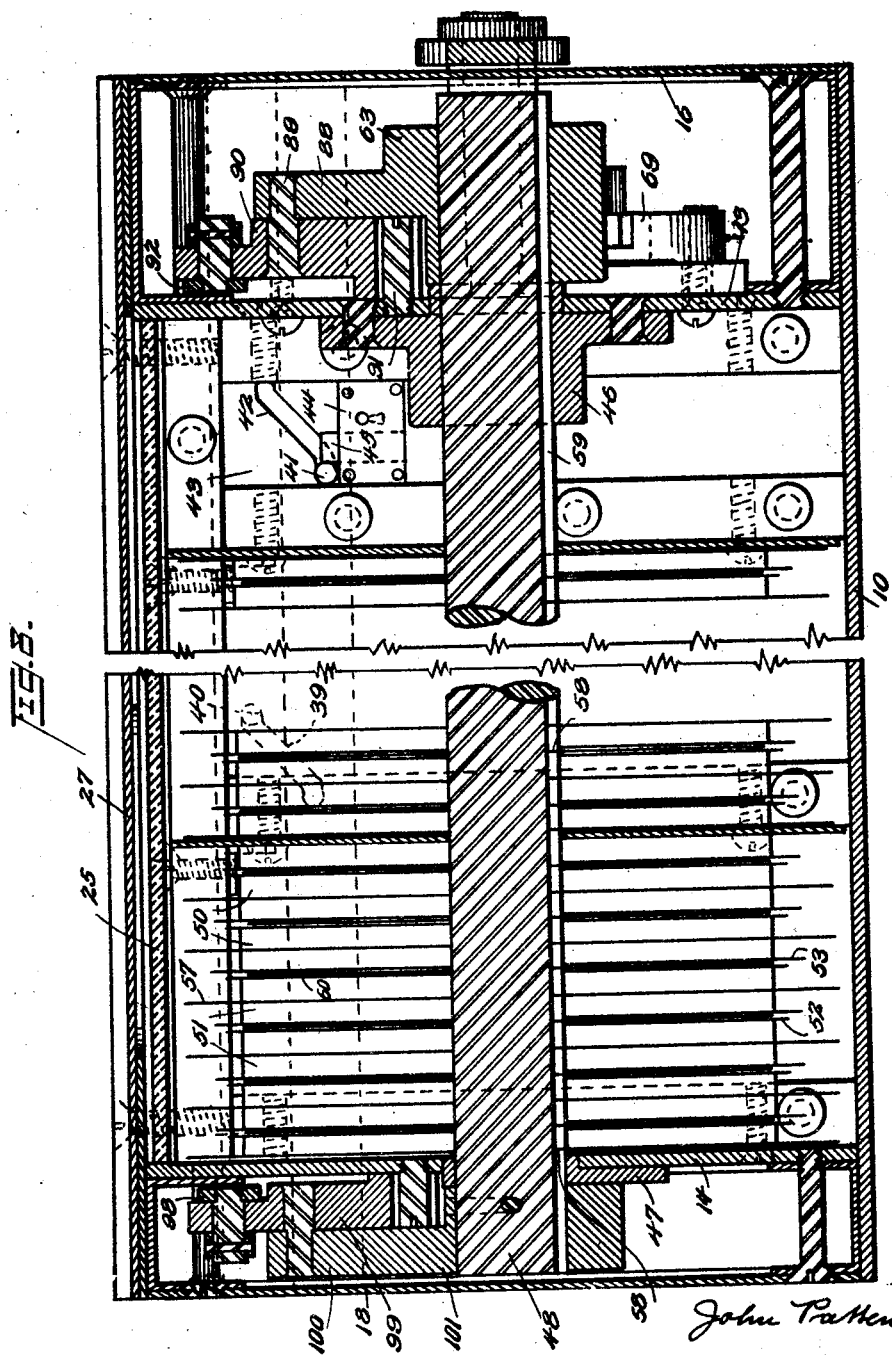

Dec. 23, 1924.
J. PATTEN
1,520,078
VOTING MACHINE
Filed May 2, 1921 12 Sheets-Sheet 9
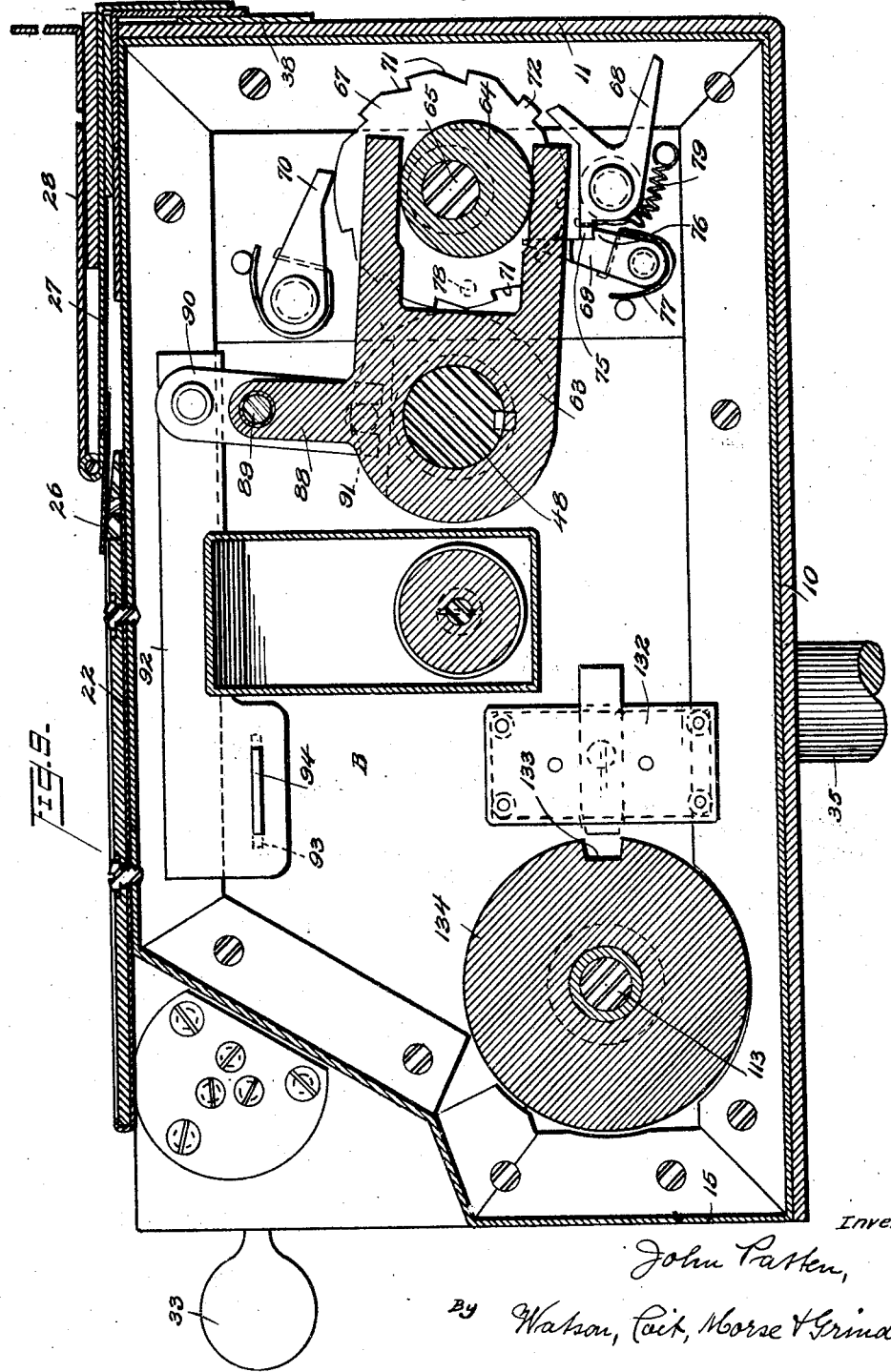
Inventor
John Patten,
By Watson, Cait, Morse & Grindle,
Att'ys Dec. 23, 1924.
J. PATTEN
1,520,078
VOTING MACHINE
Filed May 2, 1921     12 Sheets-Sheet 10
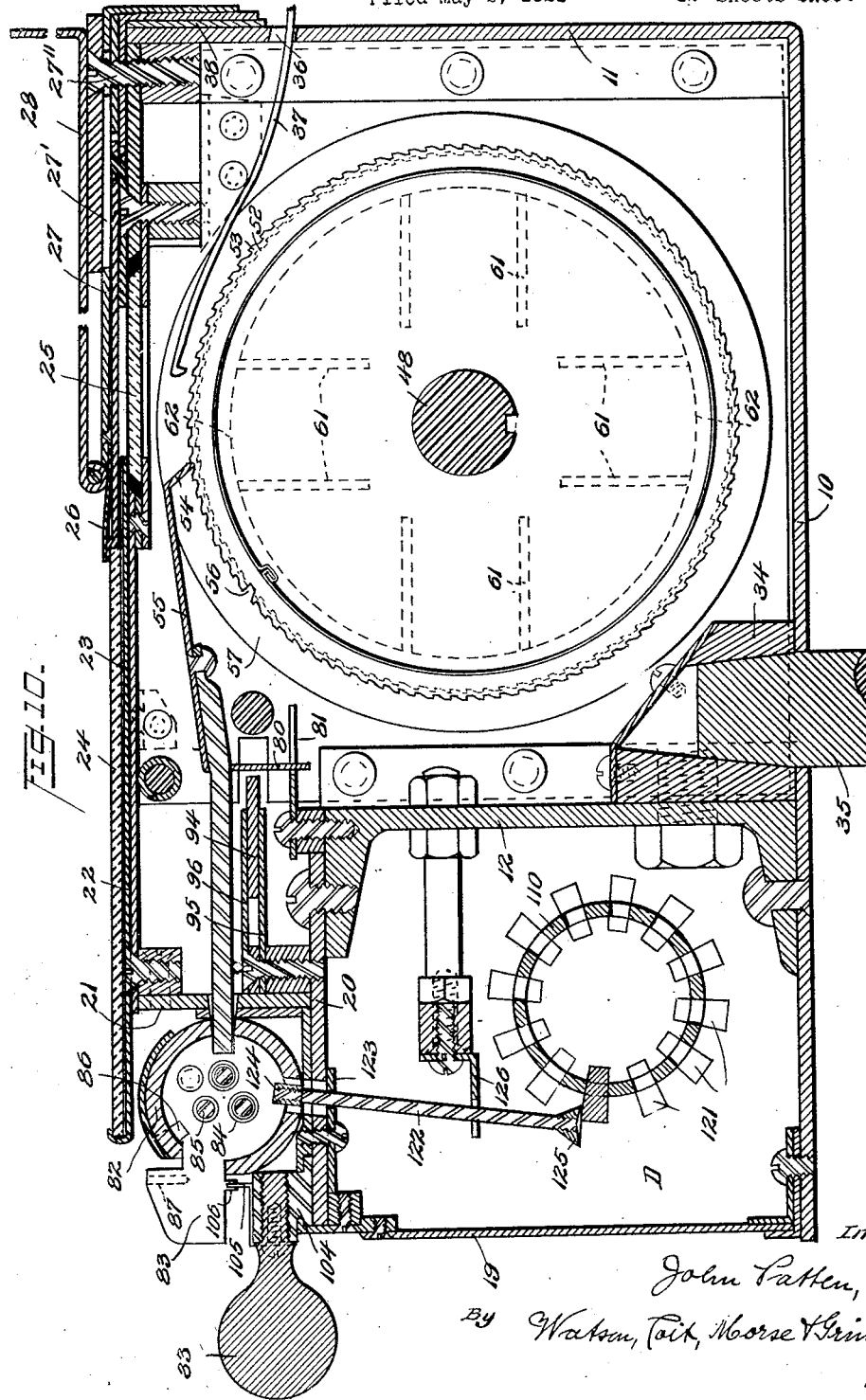
Inventor.
John Patten,
By Watson, Coit, Morse & Grindle,
Attys

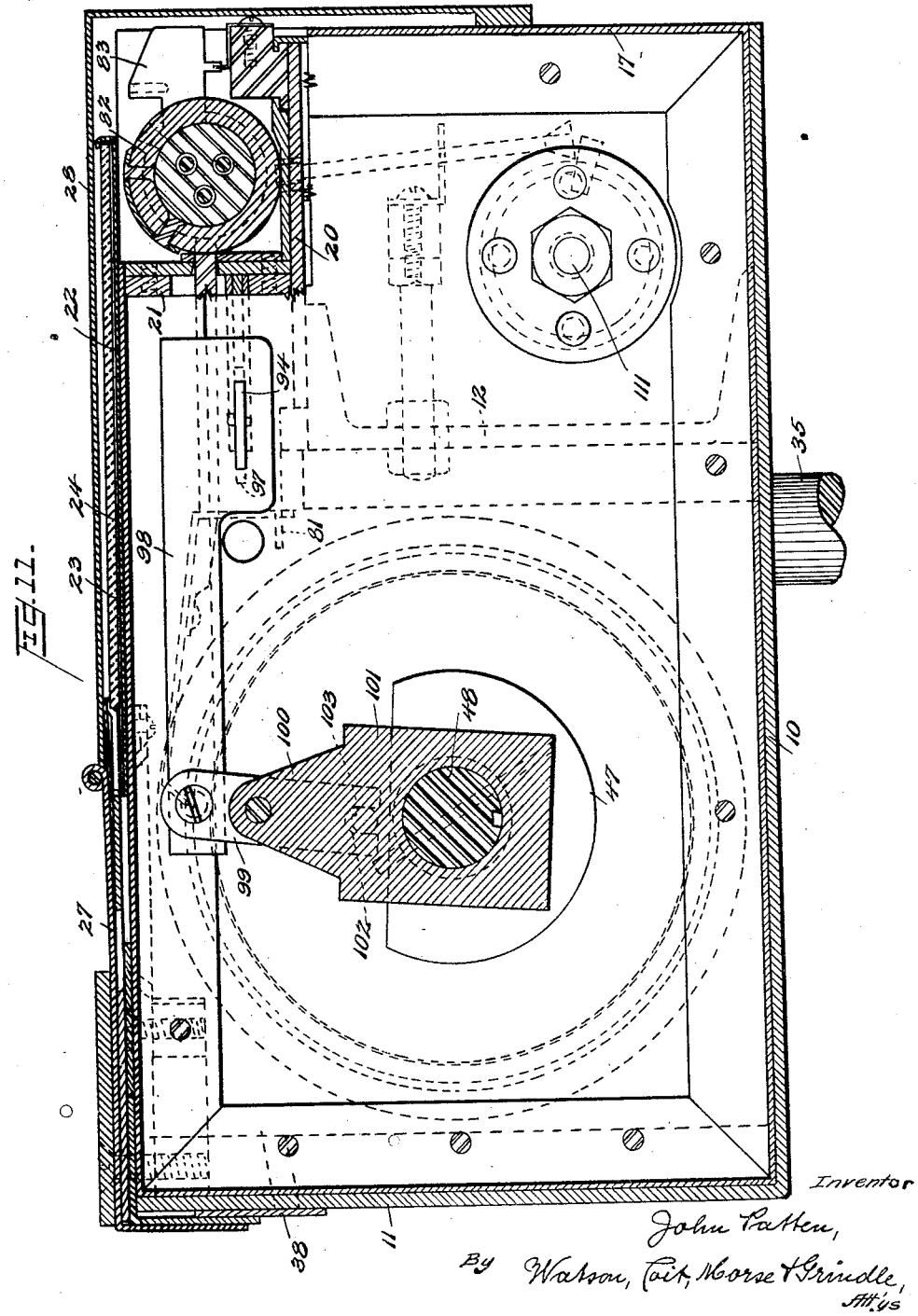

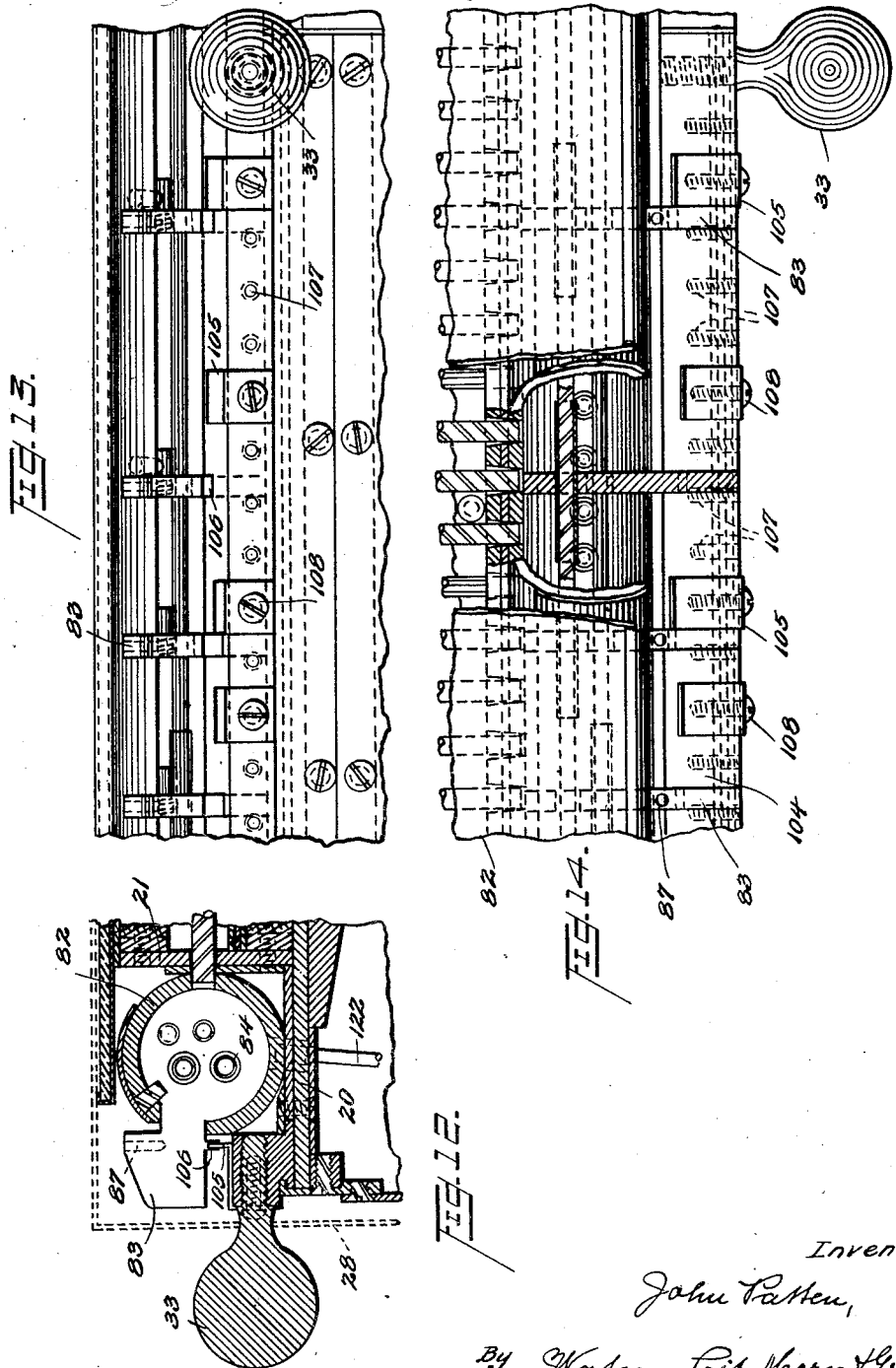

Patented Dec. 23, 1924.

1,520,078

UNITED STATES PATENT OFFICE.

JOHN PATTEN, OF BALTIMORE, MARYLAND, ASSIGNOR OF ONE-HALF TO S. M. SHOE-MAKER, OF BURNSIDE, ECCLESTON, MARYLAND.

VOTING MACHINE.

Application filed May 2, 1921. Serial No. 466,139.

*To all whom it may concern:*

Be it known that I, JOHN PATTEN, a citizen of the United States, and residing at Baltimore city, State of Maryland, have invented certain new and useful Improvements in Voting Machines, of which the following is a specification.

The present invention relates to voting machines or machines for registering the ballots of individual voters in elections and giving the sum totals of all votes cast for the respective candidates, at the conclusion of the balloting.

A machine made in accordance with this invention may be used in municipal, State, and national general elections, and in primary elections and obviates the necessity of using paper ballots with the resulting loss of time involved, the chances for dishonesty and fraud on the part of the election officials, misunderstanding and mistake on the part of the voter, and general inaccuracy and inefficiency.

The machine may be quickly and easily operated by a voter of average intelligence with hardly a chance for mistake, to vote either a straight party ticket or to vote for individual candidates who may belong to different political parties, that is, to split the ticket.

The machine is provided with a plurality of counting or tabulating devices and a plurality of keys, one key being provided for each office which it is the purpose of the election to fill, and one counting or tabulating device being provided for each candidate. Each key is shiftable along the counters allotted to the candidates for the particular office and may, therefore, be arranged to operate the counter for any candidate for that office. A printed ballot is arranged adjacent the keys and adjacent the counters, this ballot having the names of the candidates thereon and divided into groups in accordance with the offices to which they aspire. This ballot is so positioned that it guides the voter in arranging the keys to operate the proper counters and so positioned relatively to the counters that the total number of votes cast for each candidate, as indicated by the individual counters, may be quickly inscribed on the ballot by the judges at the completion of the election, each name on the ballot being followed by a blank space for this total and this blank space being very close to the indicating surface of the counter so that after the total has been written thereon, it may be quickly and easily compared with the number indicated by the counter, to avoid error. The paper ballot may then be removed from the machine by the judges, signed, and forwarded as an official report.

Other novel features of the invention consist in the construction and arrangement of the counters whereby a large number of counters may be installed in a relatively small place; in the mechanism for operating the counters; and in the novel mechanism for enabling the voter to cast a straight party ballot and without indicating to an official or to any bystander what ticket it is that he is voting for. Still another feature of the invention resides in the casing which encloses the apparatus, this casing fully protecting the machine from injury and fraudulent manipulation, while at the same time, presenting the necessary guides and directions to the voter to enable him to accurately cast his ballot. A further feature of the invention resides in the provision made for enabling a voter to cast a ballot for himself or another individual whose name does not appear on the ballot as a candidate. The machine is also provided with novel means whereby the voter, after arranging the selecting keys and operating the handle to cast his ballot can quickly and easily return the keys to a neutral position so that no voter will know for what candidates the preceding voter cast ballots. Other features and advantages of the invention will become apparent as one embodiment thereof is disclosed by way of example in the accompanying drawings and in the following description.

In the drawings:

Fig. 4 is a section on line 4—4 of Figure 5;

Fig. 5 is an end view of the machine as seen from the right (Figure 1);

Fig. 6 is a section on line 6—6 of Figure 5;

Fig. 7 is a section on line 7—7 of Figure 5;

Fig. 8 is a section on line 8—8 of Figure 5;

Fig. 9 is a section on line 9—9 of Figure 4;

Fig. 10 is a section on line 10—10 of Figure 4;

Fig. 11 is a section on line 11—11 of Figure 4;

Fig. 12 is a section through the slideway for the selecting keys;

Fig. 13 is a side elevation of portion of the key slideway; and

Fig. 14 is a top view of the same partly broken away.

Figure 1:
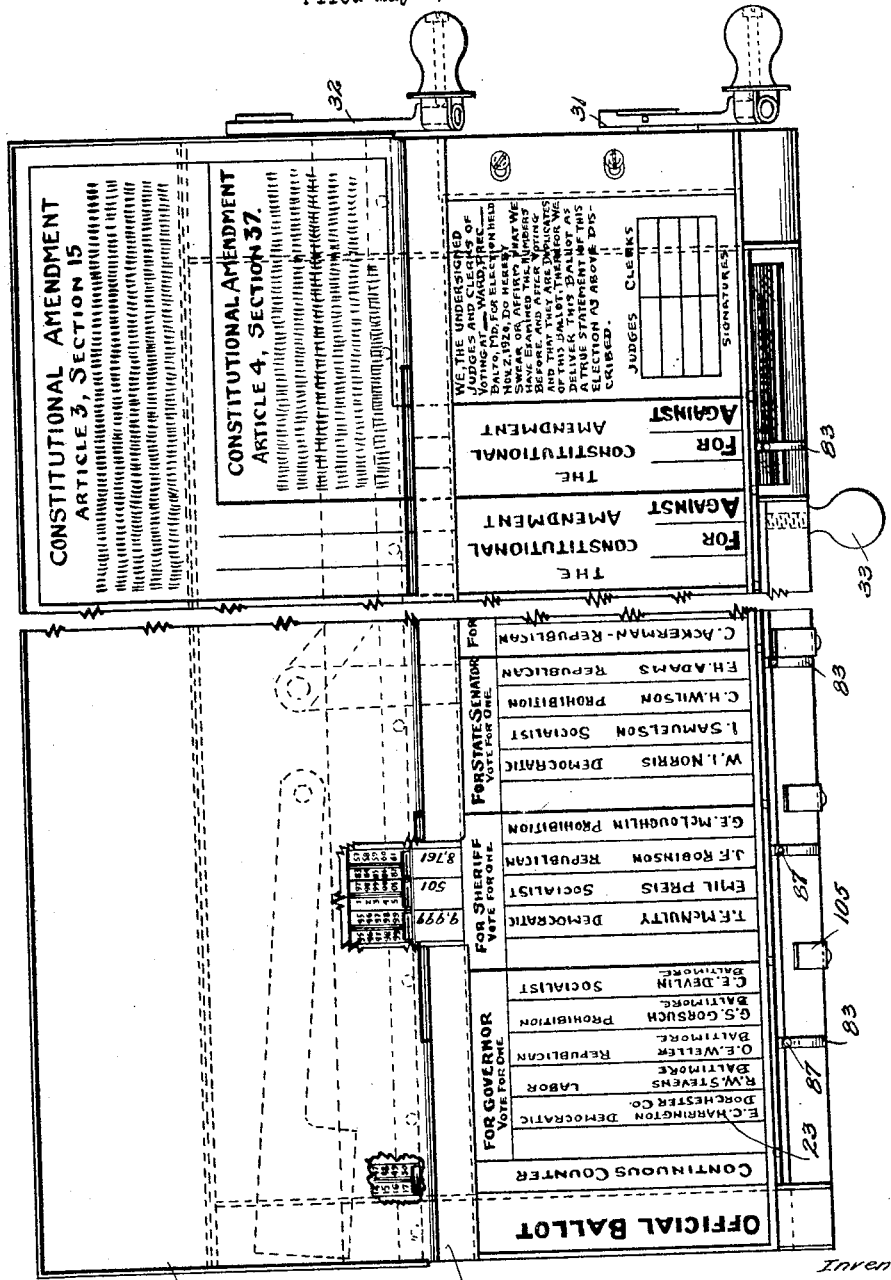
Figure 1 is a plan view of a voting machine, partly broken away.

The mechanism of the voting machine is contained within a casing which supports the various moving parts and acts to protect them from the weather and to prevent fraudulent manipulation of the counters during an election. This casing is preferably of sheet metal and rectangular in both longitudinal and cross section, being adapted to be supported upon a tripod or stand or to be placed upon a table or bench. In the several cross sectional views of the machine the parts are shown practically full size, and also in the longitudinal sectional views, although in such views considerable portions are omitted inasmuch as it is of considerable length, usually between four and six feet.

The bottom 10 and rear wall 11 of the casing are formed preferably from a single piece of relatively thick sheet metal and these walls support all of the other stationary and moving parts of the machine. Extending longitudinally and parallel to the rear wall 11 is a channel member 12 which is somewhat shorter than the rear wall, as shown in Figures 4 and 6, and parallel transverse partitions 13 and 14 extend from the rear wall 11 to the front edge of the bottom 10, these partitions making tight joints with the ends of the channel member 12. At the right hand end of the casing and resting against those portions of the bottom and rear wall which lie outside of partition 13, is a channel shaped sheet metal member 15, secured to partition 13, and closing the end of the chamber which this channel member forms in conjunction with partition 13, is a sheet metal plate 16. At its opposite end, beyond the partition 14, the casing is provided with a chamber of substantially similar shape although somewhat narrower, this chamber being formed by a channel shaped sheet metal member 17, and the end plate 18, both of which are secured to partition 14. Between the front edges of transverse partitions 13 and 14 extends the vertical front wall 19 of the casing, and secured to the top of the channel member 12 and projecting forwardly therefrom is a horizontal plate 20 the outer edge of which is substantially in the same vertical plane as the front wall 19. This plate 20 extends of course only between partitions 13 and 14 and a vertical plate 21, supported upon its upper surface, also extends between partitions 13 and 14 and supports on its upper edge the forward edge of the permanently fixed cover of the casing. The fixed cover includes a plate 22 upon which the paper ballot 23 is supported, which ballot is held in position by glass plate 24, and also includes a glass window 25 which is positioned immediately above the counters so that they may be observed when the window is uncovered. The edge of the paper ballot nearest the window 25 is not covered by glass 24, as can be seen from Figures 1 and 10, but this strip, upon which the totals are to be written at the conclusion of the balloting, is normally covered by an extension 26 of the sliding cover 27. This cover 27 is provided with slots 27' through which securing screws 27" extend so that the cover may not be removed from the casing but can be freely slid forwardly and rearwardly in order that window 25, as well as the inner side of the ballot, may be covered and uncovered at will. The sliding cover 27 has a swinging lid 28 which is adapted to be turned back to the position shown in Figures 1 and 10 when the voting is in progress and to be thrown forwardly into closed position, as illustrated in Figure 5, when the machine is not in use.

Referring particularly to Figure 5, it will be seen that the swinging lid has end portions which lie parallel to the end walls of the casing when the lid is down and that the right hand end portion is notched at 29 and 30 to receive the inturned shanks of the handles of operating levers 31 and 32 respectively and to lock them in inoperative position. The handles of these operating levers are turned outwardly when the machine is being used and secured in such position, but are inturned when the machine is not in use and extend into chambers provided for them so that they can not be damaged or broken off, and are also locked so that the machine cannot be operated. A suitable padlock may be used to lock the swinging lid 28 in closed position to prevent manipulation of the operating keys and operating handles. The lid 28 is also notched to receive the shank of an operating handle 33 which projects forwardly from the machine and which will hereinafter be more fully described.

The machine may be placed upon a flat table or bench top, or it may be supported upon legs and for this latter purpose its bottom is perforated at one or more places and immediately above the perforations are positioned internally tapered sockets 34

(Fig. 10), these sockets being rigidly attached to the channel member 12. The tapering outer end of a post 35 is adapted to project within each of these sockets, the lower ends of these posts being firmly mounted upon suitable foundations. These posts form a firm support for the casing while the machine is in use and, when the voting is finished the casing may be freely lifted from the posts, not being positively secured thereto in any manner.

In the rear wall 11 are formed a series of apertures 36, one aperture being provided immediately in rear of each counter and through these apertures may be inserted a setting tool 37 which is provided for the purpose of resetting the counters after the balloting is completed. To prevent manipulation of the counters by unauthorized persons before or during the balloting, it is necessary to close these openings and for this purpose the sliding guard plate 38 is provided which may be moved to cover the openings 36. This plate 38 is shown in Figures 5, 8 and 10 and has a plurality of parallel inclined slots 39 therein into each of which a stationary pin 40 secured to the casing extends. Adjacent its right hand end (Figure 8) plate 38 has a laterally projecting pin 41 which extends into inclined slot 42 formed in a plate 43 secured to the casing. If moved to the right therefore (Figure 8) pin 41 will ride upwardly in slot 42 and plate 38 will move upwardly, all of the pins 40 in slots 39 assisting in this movement. A lock 44 is secured to the inside of the casing this lock being operable from without and the bolt 45 thereof being adapted to extend upwardly into the path of pin 41 of plate 38 to prevent movement of the pin and plate 38. With the bolt in such position therefore the plate is locked and can not be moved to uncover openings 36 until it has been unlocked by the proper person.

The casing therefore comprises four principal compartments, (see Fig. 6) the center or main compartment A containing the counting devices, the end compartments B and C respectively containing portions of the operating mechanism, and the forward compartment D containing mechanism adapted to be used only when a voter wishes to cast a straight party ballot, or in primary elections. The mechanism contained in these compartments will now be described.

Journalled in the bearing members 46 and 47 respectively, which are secured to the transverse partitions 13 and 14, is a rotatable shaft 48, this shaft extending parallel to the rear wall of the casing and supporting all of the counters. The counters, as before pointed out, are positioned in the main compartment A and are divided into groups of preferably six transverse partitions 49. There may be any number of counters but always one for each candidate whose name appears on the ballot, and the groups of counters may be of any size, it being unnecessary in fact to so group the counters, the primary function of partitions 49 being to support shaft 48 at a number of intermediate points so that it will not sag due to its own weight and the weight of the counters mounted thereon.

Each counter comprises two independently rotatable wheels 50 and 51 each wheel having on its periphery transversely imprinted numerals starting with 00 and running consecutively to 99. Flanges 52 and 53 respectively projecting radially from the counting wheels are provided with notches, (Fig. 3) one notch opposite and corresponding to each number on the wheel and the flanges, being of unequal height with the larger flange on the units and tens counter 51, the end 54 of plunger 55 can normally contact only with the teeth of flange 53. One notch 56 of the units and tens counter is however cut much more deeply than the other notches and when in the operation of the counter this notch comes under the end of the plunger, the latter, when it falls thereinto, will engage the flange 52 of the hundreds and thousands counter 50.

Between each pair of counters are plates 57 having projections 58 which enter the longitudinal keyway 59 (Fig. 8) of the shaft, and are therefore constrained to rotate therewith. Positioned between the counters of each pair are metal plates 60 which are slotted substantially radially, as indicated at 61 (Figure 10) and each of which also has a projecting portion extending within keyway 59 so that these plates contact with shaft 48 at all times as well as plate 57. Tongues 62 located between the pairs of slots 61 are bent or sprung laterally to some extent so that each plate exerts a lateral pressure on the counting disks 50 and 51 between which it is located, forcing these disks against plates 57. Disks 50 and 51 are not keyed to the shaft but are constrained to rotate therewith by the action of plates 60 which force them into frictional engagement with plates 57.

Secured on the end of shaft 48 which extends into the end compartment B is a yoke 63 (Figs. 6 and 9) having parallel spaced arms extending on opposite sides of cam 64 fixed on shaft 65 which is journaled in the end plate 16 and in a block 66 secured to partition 13. Operating handle 32 previously referred to, controls the movement of shaft 65 and means is provided whereby each voter may rotate this shaft through one complete revolution in casting his ballot after which it is automatically locked, to be released only by one of the judges of the election. This means comprises the gear 67, locking pawl 68, the catch 69, and the non-return pawl 70. Gear 67 has a number of teeth 71 which cooperate with the spring pressed pawl 70 in insuring that shaft 65 may be rotated in one direction only, and has also a square tooth 72 which is adapted to cooperate with the locking pawl 68, when a complete rotation of shaft 65 has been made, to prevent further rotation thereof.

In Figures 5 pawl 68 is shown in locking position engaging tooth 72 and preventing clockwise rotation of shaft 65. Pawl 70 of course prevents counter clockwise rotation. To release gear 67 so that a voter may operate the machine it is necessary that pawl 68 be disengaged from tooth 72 and to this end one of the election judges will insert a tool 73 through an aperture 74 in the wall of the casing and press downwardly on the laterally extending arm of pawl 68 to rock the same so that it disengages tooth 72. As pawl 68 rotates in a clockwise direction the lug 75 (Fig. 9) projecting rearwardly therefrom will ride upwardly along the face of catch 69 until it passes over the shoulder 76, when the catch will snap forwardly due to action of spring 77 and lock pawl 68 in the position illustrated in Figure 9 so that shaft 65 may be freely rotated through 360° by the handle.

When the shaft has nearly completed one revolution in a clockwise direction, however, the pin 78 of gear 67 strikes the tip of catch 69 and throws the same towards the left (Figure 9) so that shoulder 76 disengages lug 75 and the pawl 68 is immediately thrown by its spring 79 into the path of tooth 72 and will engage this tooth to stop further rotation of the shaft when the same has completed exactly 360°.

A complete rotation of shaft 65 produces, through the coaction of cam 64 and yoke 63, an oscillation of shaft 48 through a small angle and thereby causes all of the counting disks, which are frictionally gripped to the shaft, to likewise oscillate through a small angle, forwardly and rearwardly. So long as the counters rotate with shaft 48 no counting action takes place but upon the occurrence of relative movement between shaft 48 and any one of the counters, counting action occurs. The means for effecting such relative rotation and counting action will now be described.

Figure 2:
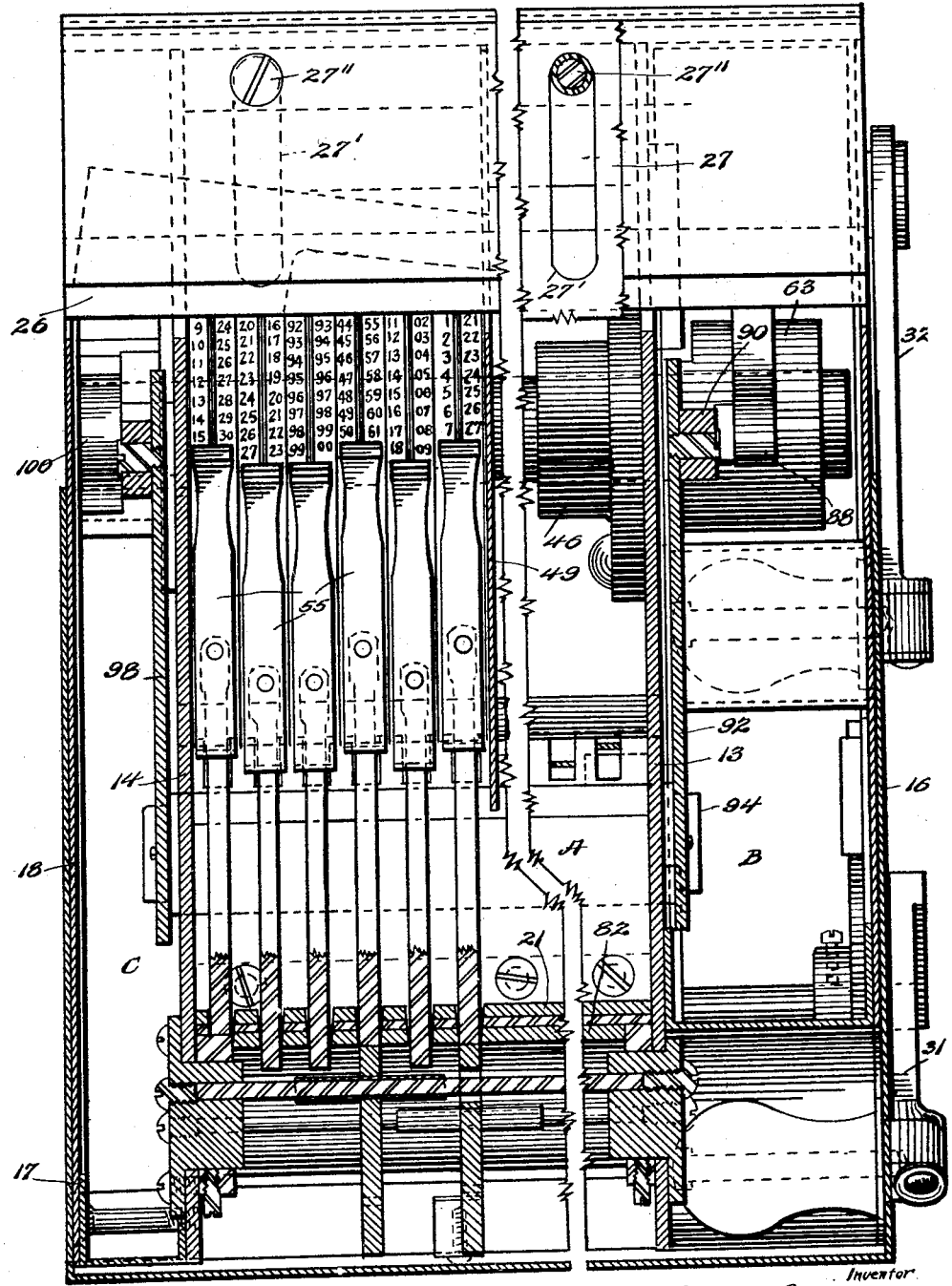
Fig. 2 is a section on line 2—2 of Figure 3.

A plunger 55 (Figs. 2 and 3) is provided for each counter, this plunger having a round shank portion and a flat sheet metal portion 54 with a downturned end which rests upon the flange 53 of the units and tens counter and which has a vertically downwardly extending portion 80 which extends into a slot of guide member 81 so that rotation of the plunger is prevented. The forward end of each plunger extends through an aperture in plate 21 and through an aperture in the rear of the tubular slideway 82 which supports and guides selecting keys 83.

Each key 83 is mounted upon a tubular member 84 slidably fitting on one of the guide rods 85 which extend from end to end of the machine. Each tube 84 is of such length that it will not bind on the supporting rod as the key is moved laterally therealong and it is necessary that these keys are perforated at three points to receive three rods 85 these perforations being somewhat enlarged so that the tube 84 of one key may project through the apertures of two adjacent keys, when the three keys are close together, every third key only being supported upon the same guide rod.

Figure 3:
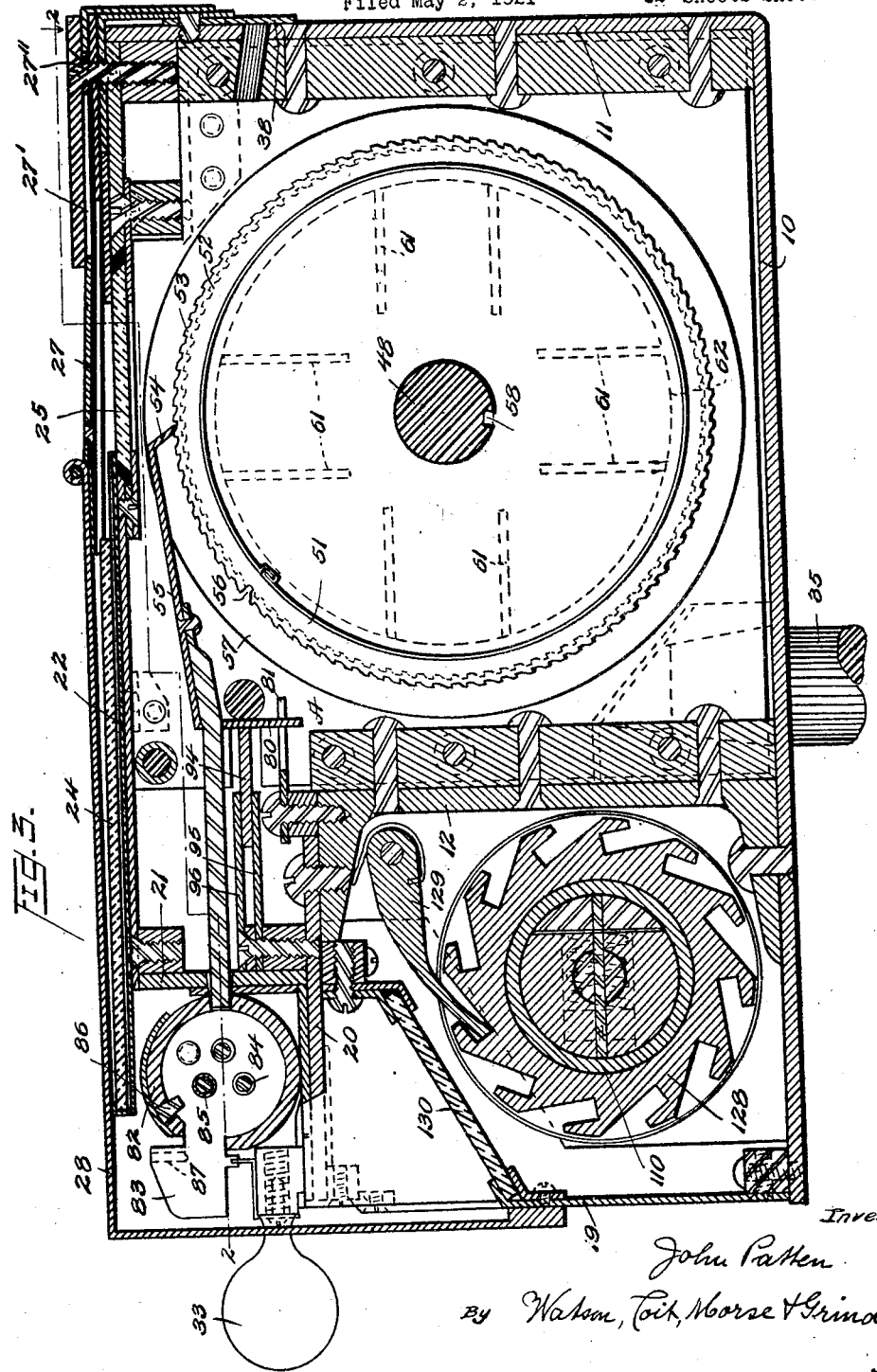
Fig. 3 is a section on line 3—3 of Figure 4.

The plungers 55 are freely movable longitudinally and normally move with the counters and with shaft 48 as the latter oscillates, a reciprocation of the plunger caused by a complete oscillation of shaft 48 carrying it from the position in which it is illustrated in Figure 3 to the position in which it is shown in Figure 10 and back again into the position of Figure 3. Such oscillation may, however, be opposed by one of the keys 83 which may be placed in such position along the slideway that the end of plunger 55 will strike the edge of the key when shaft 48 is oscillated. The plunger 55 being unable to move, likewise prevents the counter disk from moving and causes relative rotation to occur between shaft 48 and the counter disk.

Yoke member 63 has an arm 88 (Figs. 8 and 9) projecting upwardly therefrom which arm supports a short shaft 89 extending laterally therefrom and rotatably mounted upon this shaft is a vertically disposed lever 90. This lever is slotted at its lower end to receive a pin 91 projecting from partition 13 and has a reciprocating horizontally disposed bar 92 pivotally secured to its upper end. This bar 92 extends toward the front of the machine and is slotted at 93 to receive one end of the cross head 94 (Figs. 2, 3 and 9) which extends longitudinally of the machine and lies immediately in front of the downwardly extending portions 80 of the plunger, being guided between plates 95 and 96 respectively. The opposite end of cross head 94 extends into a slot 97 (Fig. 11) in bar 98 which is similar to bar 92 and is pivoted at its rear end to a lever 99 pivotally supported at an intermediate point upon the upwardly projecting arm 100 of a member 101 fixed on the end of shaft 48, and being slotted at its lower end at 102, exactly as in the case of lever 90, to receive a pin 103 secured to the partition 14

As shaft 48 is rocked or oscillated, an exaggerated or increased motion is given to the two horizontal rods 92 and 98, the levers 90 and 99 serving as multiplying levers and cross head 94 being given thereby a sufficient movement so that it will act to return all of the plungers to their initial positions notwithstanding the lost motion between cross head 94 and the members 92 and 98 due to the slotted connection. Cross head 94 serves a double function of preventing forward movement of the plungers except when the machine is operated in the proper manner and also serves to reset the plungers after the machine has been operated, it being understood, however, that the cross head merely returns the plungers as the counters rotate in a clockwise direction (Figure 10) and that this returning movement does not effect relative movement between the downturned inner end of the plunger and the counter.

At the completion of an oscillation of shaft 48 and where the movement of a particular counter has been opposed by a plunger, this counter will have been advanced through one notch or unit space around shaft 48, in a clockwise direction. After 99 of such unit advances of the units and tens counter, the end of the plunger will fall into the deep cut 56 in the toothed gear 53 and upon the 100th oscillation of shaft 48 both disks of the counter will be simultaneously moved so that the units and tens disks will register 00 and the tens and hundreds disk 50 will register 1. This is repeated at the completion of each 100 votes until the total capacity of the counter has been exhausted, that is, 9,999 votes. It is unusual in most voting precincts to have a larger vote than 9,999 cast for any one candidate. If in fact, however, the precinct is so large that there is a probability that 10,000 or more votes be cast for a single candidate, three counting wheels may be used instead of two.

As shown clearly in Figure 1, the ballot 23 extends longitudinally of the machine and has printed thereon the names of the candidates divided into groups according to the various offices to which they aspire. The numbers of candidates in each group may, of course, vary. For instance, there may be six candidates for governor and four for sheriff &c., but for each office or group of candidates a key 83 is provided, the key provided for each group being movable between two stops 86 (Fig. 3) positioned to project into the tubular guideway 82 between the group of candidates for one office and the group for the office which is printed on the adjacent portion of the ballot. Each key may be moved, therefore, to be placed in alignment with the name of any candidate selected for the particular office, or may be moved if desired, in front of the blank space which heads each group.

In voting, a key 83 is placed in front of one of the names and shaft 48 is reciprocated, the counter which corresponds to that particular name will be actuated by the plunger 55 but the other plungers merely reciprocate and do not cause relative movement of the counting disk relative to shaft 48. In casting his ballot the voter will slide the selecting key provided for each office until it is in alignment with the name of the candidate for which he desires to vote. If there are ten offices to be filled he will manipulate ten keys in this manner and, upon rotation of the operating handle and reciprocation of shaft 48, ten votes will be recorded simultaneously. In case the voter does not care to cast a ballot for one particular office he may place the key corresponding to that office in front of the blank space so that no vote is registered for any particular candidate although, by means of counters provided for the blank spaces, that it will be apparent at the conclusion of the election how many such votes were cast.

As it is sometimes desired by individual voters to cast a ballot for some person whose name does not appear on the official ballot provision is made for permitting this to be done. Each of the keys 83 has a vertical cylindrical aperture 87 which may receive a small rolled up paper ballot. When the voter desires to cast such an individual ballot he writes the name of his candidate on a small slip of paper, rolls it up, inserts it within the aperture 87 and places the key which holds this ballot opposite the blank space corresponding to the particular office. When this procedure is followed, the judge has only to observe that the key holding the paper ballot is actually in front of the blank space when the voter rotates the operating arm, thereby making sure that he is not casting two votes for one particular office, that is, a vote on paper and a vote on the machine. After the operating arm has been rotated the paper ballot or ballots are removed by one of the judges and placed in a proper receptacle to be counted at a later time.

After a ballot has been cast in this manner it is desirable to have each of the keys 83 placed opposite the several blank spaces so that the next voter can not ascertain how his predecessor voted. To quickly accomplish this, means is provided for moving the keys back simultaneously, this means comprising a bar 104 (Fig. 10) slidably mounted upon the forward edge of plate 20, a plurality of upwardly projecting stops 105 secured at intervals to the bar and a plurality of downwardly extending projections 106 rigid with the keys 83. The bar may be moved longitudinally of the machine by means of the handle 33 and the extent of movement is determined by the greatest distance which any key will have to travel in returning from its right hand position (Figure 1) to its left hand position (Figure 1) or opposite the blank space. The stops 105 are arranged at different points along bar 104, as clearly shown in Figure 14, the bar being provided with a series of openings 107 to receive screws 108 securing the stops to the bar. The upwardly projecting portions of the stops are positioned at different distances from the outer edge of the bar and the downwardly projecting portions 106 of keys 83 are so positioned on the under side of the keys that each stop is adapted to contact with and move one particular key only, its upwardly projecting portion missing the downwardly projecting portions of all other keys when the rod is moved.

The stops are positioned to return all keys to their initial positions upon one movement of rod 104. Where a key is to be returned the maximum distance, which is six spaces, its stop will be arranged immediately to the right of the right hand space so as to contact with the key if such key is in the right hand space, immediately after the bar is started. If there are only three candidates, and the key is only to be moved three spaces to initial position, the stop will be positioned three spaces to the right of the space which the key would occupy in its farthermost right hand position and so that it will travel three spaces before striking the key and will travel three spaces pushing the key before it, each stop necessarily moving a total of six spaces with rod 104. Other stops may be arranged to move keys through distances depending upon the number of candidates in the office for which the particular key is the selecting instrument. In positioning the keys prior to voting, the rod 104 is moved to the right, while after voting it is moved to the left by manipulating handle 33 and the key simultaneously reset to initial position.

It is frequently the case that the voter does not desire to vote for any candidate outside of his own political party, that is, he desires to vote a straight party ticket, and to save time mechanism is provided whereby the positioning of the keys opposite the names of all of the candidates representing any particular party can be readily accomplished.

In the forward chamber D is positioned a cylinder 110 which extends longitudinally of the machine and has its ends rotatably supported in partitions 13 and 14 respectively. The left hand end of this cylinder (Figure 6) is rotatably mounted upon a pin 111 supported in partition 14 and the right hand end is rotatably supported upon the inwardly extending cylindrical portion of a member 112 secured within an aperture in partition 13. This member 112 has a central cylindrical opening in which is rotatably supported shaft 113 to the outer end of which the operating lever 31 is fixed and which has at its inner end the friction clutch K provided to frictionally connect cylinder 110 and shaft 113.

This clutch comprises a member 114 pinned to the end of shaft 113 and having a transverse aperture 115 in which is positioned the coiled spring 116, one of which bears against screw threaded cap 117 and the other end of which bears against shoe 118 which is radially movable. Shoe 118 has a radial aperture to receive with a sliding fit the end of pin 119 and to be held in position thereby against circumferential movement relatively to shaft 113. The pressure of spring 116 is sufficient to insure frictional engagement of cylinder 110 and shaft 113 for simultaneous rotation so long as the movement of cylinder 110 is unimpeded, but will allow relative movement between the shaft and cylinder when the cylinder is positively prevented from rotating.

The cylinder is provided with a plurality of rows of apertures 120 the rows extending longitudinally and circumferentially, there being one longitudinal row for each political party having candidates whose names are printed on the ballot and one row of holes circumferentially for each candidate whose name appears on the ballot. Into these apertures may be inserted tapering plugs 121, one plug being inserted in each circumferential row. These plugs are adapted to cooperate with a series of rods 122 (Figs. 7 and 10) which extend through apertures in the plate 123 secured to plate 20 and which have heads 124 and 125 at their upper and lower ends respectively. A series of apertures are cut in the bottom of the slideway 82 and when cylinder 110 is rotated in a clockwise direction (Figure 10) a plug may strike the lower end of the rod and lift it until its upper end lies in the pathway of key 83. There is one rod for each candidate, the rods being positioned just to the right of the space which the key must occupy when in position to cause a vote to be registered for that candidate.

An angle bar 126 supported from the channel member 12 has a slot at its forward end for each rod 122 and serves as a guide therefor. Supported on the right hand end of cylinder 110 is a second and concentric cylinder 127 (Figs. 4 and 7) on which are printed the longitudinally disposed names of the political parties having candidates in the election, as shown in Figure 7. Also secured on the end of cylinder 110 is a ratchet wheel 128 which is clearly shown in Figure 3, the teeth of this ratchet wheel cooperating with pawl 129 in positioning the cylinders 110 and 127. When moved in a counter clockwise direction (Figure 3) by the operating handle, the motion of ratchet wheel 128 is unobstructed, pawl 129 merely riding idly over its teeth and making a clicking noise which is audible to the voter operating the handle. When, however, the handle is turned in a clockwise direction, the pawl 129 will engage one of the teeth and will prevent further movement of the cylinder in this direction. Sudden stoppage of the ratchet wheel, however, will not cause a sudden stoppage of the operating handle which will move on due to the frictional connection between the same and cylinder 110.

There is one tooth of ratchet wheel 128 for each political party named on cylinder 127 and when pawl 129 is in engagement with a particular tooth, the name of the particular political party corresponding to that tooth will appear directly beneath the window 130, and in this position of the cylinder all of the rods 122 corresponding to that particular party will be raised into the uppermost positions as illustrated in Figure 10. The voter may then move his hand along the keyboard and move all of the keys as far as possible to the right, that is, he will move each key until it contacts with the stop 122 which will halt its movement exactly opposite the plunger and the counter which must be operated to register a vote for the party candidate for the particular office. In raising the stops, cylinder 110 is first rotated in a counter clockwise direction in which movement the pins 121 ride idly by the lower ends of rods 122. When the name of the desired party appears beneath window 130, however, the voter reverses the movement of the operating handle and cylinder 110 until pawl 129 has engaged the recess of the proper tooth. The operator can observe both the cylinder 127 and pawl 129 through the window 130 and can make no mistake in positioning the cylinder.

After having positioned the keys and cast a vote for the party candidates, the operator may move the handle 33 as before, so that the subsequent voter can not ascertain the party of his predecessor. For locking the shaft 113 in a fixed position a lock 132 is provided, the bolt of which is adapted to enter a recess 133 (Fig. 6) in a disk 134 secured to the shaft 113. This locking device is called into play in primary elections and prevents the voter from casting a ballot for candidates not in his own political party.

From the foregoing description the construction and operation of the machine will be apparent and it will also be obvious that many changes may be made in the design and arrangement of parts of the invention within the scope thereof, the particular machine herein illustrated and described being by way of example only.

Having thus described the invention what is claimed as new and desired to be secured by Letters Patent is:

1. A voting machine including in combination, a plurality of counting devices, one counting device being provided for each candidate, means for concealing said counting devices from view during the voting, and means for supporting a ballot on said machine, having a list of candidates printed thereon, with an edge of the ballot adjacent the counting devices and the printed name of each candidate opposite a separate counter so that the sums recorded by the counting devices may be conveniently transcribed to the ballot when the counting devices are uncovered.

2. A voting machine including in combination, a plurality of counting devices, one counting device being provided for each candidate, a casing enclosing said counters and having an opening through which the counters may be inspected, means for supporting a ballot on said casing with the name of each candidate opposite a separate counter and the blank margin of said ballot in close proximity to the counters, and means movable to cover said opening and the blank edge of the ballot when the machine is in use and movable to uncover the opening and the blank edge of the ballot when the totals are to be transcribed on the ballot.

3. In a voting machine, in combination, a member having a series of numerals and means for intermittently advancing said member including a movable element to which said member is frictionally connected, means to oscillate said element, and key controlled means for preventing movement of said member in one direction to cause relative movement of the member and element.

4. A voting machine, including in combination, a support, means for oscillating said support, a member having a series of numerals thereon mounted on said support and frictionally connected thereto for movement therewith, and key controlled means for preventing movement of said member in one direction to effect relative movement between said support and member.

5. A voting machine, including in combination, a support, means for oscillating said support, a member having a series of numerals thereon mounted on said support and frictionally connected thereto for movement therewith, and means adapted to be adjusted to positively engage said member and to prevent movement thereof in one direction to effect relative movement between said support and member, upon an oscillation of said support.

6. A voting machine, including in combination, a support, means for oscillating said support, a member having a series of numerals thereon mounted on said support and frictionally connected thereto for movement therewith, a plunger engaging said member and adapted to be moved thereby in one direction upon an oscillation of said member, and a manually adjustable element adapted to be positioned to obstruct the path of said plunger and to effect movement of said member relatively to the support.

7. A voting machine, including in combination, a support, means for oscillating said support, a member having a series of numerals thereon mounted on said support and frictionally connected thereto for movement therewith, a plunger adapted to be positively gripped and moved by said member when moving in one direction and to be released by said member when moving in the opposite direction, and a manually adjustable element adapted to be positioned to obstruct the path of said plunger and, by preventing its movement when the support oscillates, to prevent movement of the member and thereby causing relative movement of said member and support.

8. In a voting machine, in combination, a plurality of counting devices, one counting device being provided for each candidate, means for selecting the counting devices to be operated, including a plurality of shiftable keys, and means for supporting a ballot adjacent the counting devices and keys so that a ballot supported on said means may have the names of the candidates opposite the proper counters to thereby serve as a guide in positioning the keys and means for operating the counters.

9. In a voting machine, in combination, a plurality of counting devices, and means for operating said counting devices including a plurality of selecting keys slidably supported on a trackway, and individually movable therealong, a stop positioned on each side of each key and limiting the movement thereof, said stops being differently spaced apart, and common means for shifting said keys simultaneously in one direction to initial position adjacent one of the stops.

10. In a voting machine, in combination, a plurality of counters, one counter being provided for each candidate, a plurality of selecting keys, one key being provided for each office to be filled and each key being slidable transversely of the counters allotted to that office, and mechanism for assisting in positioning the keys in operative relationship to the counters corresponding to candidates of the same political party, including a plurality of movable stops, and means for moving said stops into the pathway of the keys.

11. In a voting machine, in combination, a plurality of counters, one counter being provided for each candidate, a plurality of selecting keys, one key being provided for each office to be filled and each key being slidable transversely of the counters allotted to that office, and mechanism for assisting in positioning the keys in operative relationship to the counters corresponding to candidates of the same political party, including a plurality of movable stops, one stop being provided for each candidate, and a rotatable cylinder having members projecting radially therefrom for selecting and moving all of the stops of one of the political parties into the pathway of the keys.

In testimony whereof I hereunto affix my signature.

JOHN PATTEN.